United States Patent
Pitchford et al.

[19]

[11] Patent Number: 5,844,981
[45] Date of Patent: Dec. 1, 1998

[54] METHOD AND SYSTEM OF IMPROVED ROUTING TO WATS

[75] Inventors: Donald Pitchford, Plano; Howard McNeil, Allen, both of Tex.

[73] Assignee: MCI Communications Corporation, Washington, D.C.

[21] Appl. No.: 563,146

[22] Filed: Nov. 27, 1995

[51] Int. Cl.$^6$ ............................................. H04M 7/00
[52] U.S. Cl. ...................... 379/221; 379/222; 379/224; 379/229; 379/240
[58] Field of Search ........................... 379/113, 115, 379/133, 219, 220, 221, 222, 224, 229, 240

[56] References Cited

U.S. PATENT DOCUMENTS

| | | | |
|---|---|---|---|
| 4,756,019 | 7/1988 | Szybicki | 379/221 |
| 4,782,519 | 11/1988 | Patel et al. | 379/221 |
| 4,866,763 | 9/1989 | Cooper et al. | 379/221 |
| 5,058,105 | 10/1991 | Mansour et al. | 379/221 X |
| 5,526,414 | 6/1996 | Bedard et al. | 379/224 X |

*Primary Examiner*—Harry S. Hong

[57] ABSTRACT

A method and system of improved routing to WATS completes calls through a wide area telephone service using indirect routing. When a call is placed from a calling telephone station to a called telephone station, a telephone network attempts to route the call from the originating switch, on which the call entered the network, to a local exchange carrier serving the called station. If other routing paths in the network are unavailable or unsuccessful, a network processor recommends a routing from the originating switch to the local exchange carrier through a tandem switch and the WATS line of another telephone network. This capability provides a reduced incidence of blocked calls, such as may result from telecommunications system outages.

11 Claims, 6 Drawing Sheets

METHOD AND SYSTEM OF IMPROVED ROUTING TO WATS

BACKGROUND OF THE INVENTION

1. Field of the Invention

The invention relates to routing of telephone calls in a telephone network, and in particular to automated routing of calls to WATS facilities of other carriers when in-carrier routing is not possible.

2. Background Information

Traditional telephone networks are hierarchical in nature. A call originates in the lowest level of hierarchy and is routed, if possible, within that lowest level. If routing within the lowest level is not possible, the call climbs the hierarchy to the next higher level. At each level, routing is attempted within the level. Only if routing within a level is not possible does the call climb up the hierarchy.

FIG. 1a is an example of a traditional hierarchical telephone network 1, including five levels of network hierarchy. Blocks 14 to 18 represent different levels of long distance network. Each level of long distance network is capable of routing calls entirely within itself and may be considered as a separate network. Block 12 represents multiple toll networks which route shorter distance toll calls. Block 10 represents multiple end office networks which can route calls only within limited areas. Together, toll networks 12 and end office networks 10 make up multiple local exchange carrier (LEC) networks 24. Telephone stations are connected to the end office networks 10. Each network level has multiple connections 11, 13, 15 and 17 to the levels adjacent to it.

Telephone station 2 may, for example, place a long distance call to telephone station 4. The call enters the network at an end office. End offices typically do not route long distance calls, so the call is transferred to toll networks 12. Toll networks 12 attempt to route the call and if they cannot do so, the call is transferred to block 14, long distance network level 3. Each level which cannot route the call transfers it to the adjacent higher level. This continues until the call is successfully routed or until block 18, long distance network level 1 cannot route the call. If level 1 cannot route the call, the call is blocked.

Another routing option is represented by block 20, wide area telephone service (WATS). Long distance carriers maintain WATS lines with other long distance carriers. These WATS lines allow a carrier to utilize the telephone networks of other carriers to complete calls when the carrier's own network cannot complete the call, for example, due to a switch failure or a trunk outage. WATS 20 is shown connected to long distance network levels 1 and 2, blocks 18 and 16 respectively, by multiple connections 21 and 22 respectively. WATS lines are typically only connected to the higher network levels. In addition, WATS lines are not connected to every switch in a network level, but only to a selected subset of the switches in a level.

Each level typically makes more than one attempt to route a call. FIG. 1b is an example of multiple call routing attempts within a level, designated 100. In FIG. 1b, a call is placed from telephone station 2 to telephone station 4. The call is to be routed from originating switch 104 to destination switch 106. Originating switch 104 first attempts to route the call over direct route 130 (first choice) to destination switch 106. If this routing is unavailable, network processor 102, communicating with the switches over signaling network 108, recommends a routing from originating switch 104 through one of the tandem switches 112 to 120 over routes 132 and 136 (second choice). If this routing is unsuccessful, originating switch 104 attempts direct routing to wide area telephone service (WATS) lines 20 over routes 134 and 138 (third choice). If routing to WATS is successful, WATS 20 completes the call to local exchange carrier (LEC) 132 over route 138. If this routing is unavailable or unsuccessful, network processor 102 cannot make any further recommendations and the call is blocked. A need exists for improved automated routing of calls in order to reduce the incidence of blocked calls.

Routing to WATS is most useful if a carrier's network automatically selects such routing when needed, without human intervention. The system shown in FIG. 1b is capable of directly routing a call from the originating switch to a WATS line, but is not capable of any additional routing to a WATS line. A need exists for a routing system which can generate additional routing to a WATS line.

SUMMARY OF THE INVENTION

The present invention, a method and system of improved routing to WATS, provides improved automated routing of calls because it is capable of generating indirect routing to WATS lines. This capability provides a reduced incidence of blocked calls, such as may result from telecommunications system outages.

When a call is to be routed from originating switch to destination switch, the originating switch first attempts to route the call over a direct route from the originating switch to the destination switch. If this routing is unavailable, a network processor, communicating with the switches over a signaling network, recommends a routing from the originating switch through a tandem switch. If this routing is unsuccessful, the originating switch attempts direct routing to wide area telephone service (WATS) lines. If this routing is unavailable or unsuccessful, the network processor finally recommends routing to WATS through a tandem switch. If this routing is unavailable, network processor cannot make any further recommendations and the call is blocked.

BRIEF DESCRIPTION OF THE DRAWINGS

FIG. 2b is an example of multiple call routing provided by system 200 of FIG. 2a.

FIG. 3 is a flow diagram of a call routing process 300, implemented in system 200 of FIG. 2a.

FIG. 4 is a block diagram of a network processor 102 of system 200 of FIG. 2a.

DETAILED DESCRIPTION OF THE INVENTION

Figure 1A:
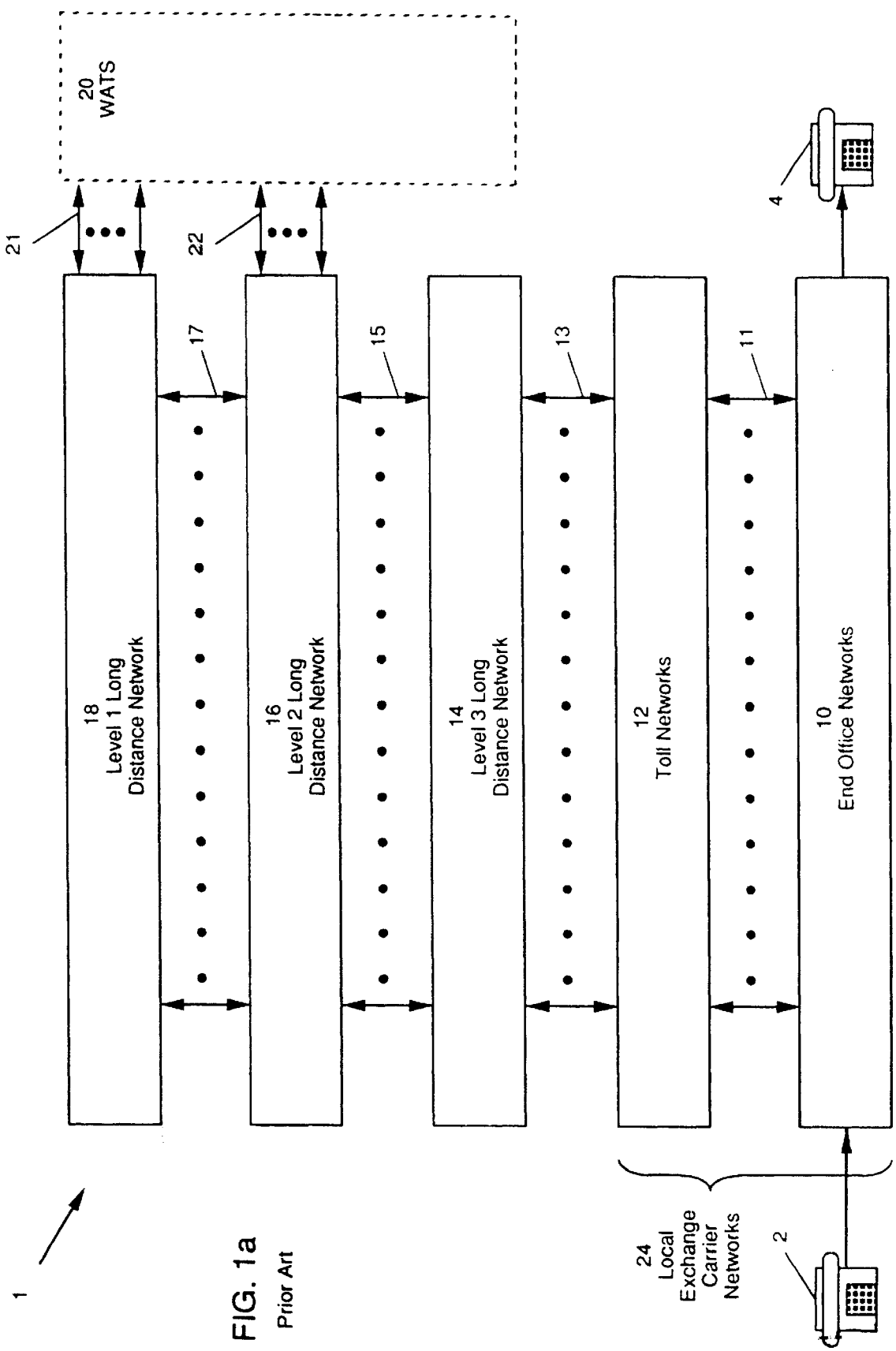
FIG. 1a is an exemplary block diagram of prior art hierarchical telecommunications network 1.
Figure 1B:
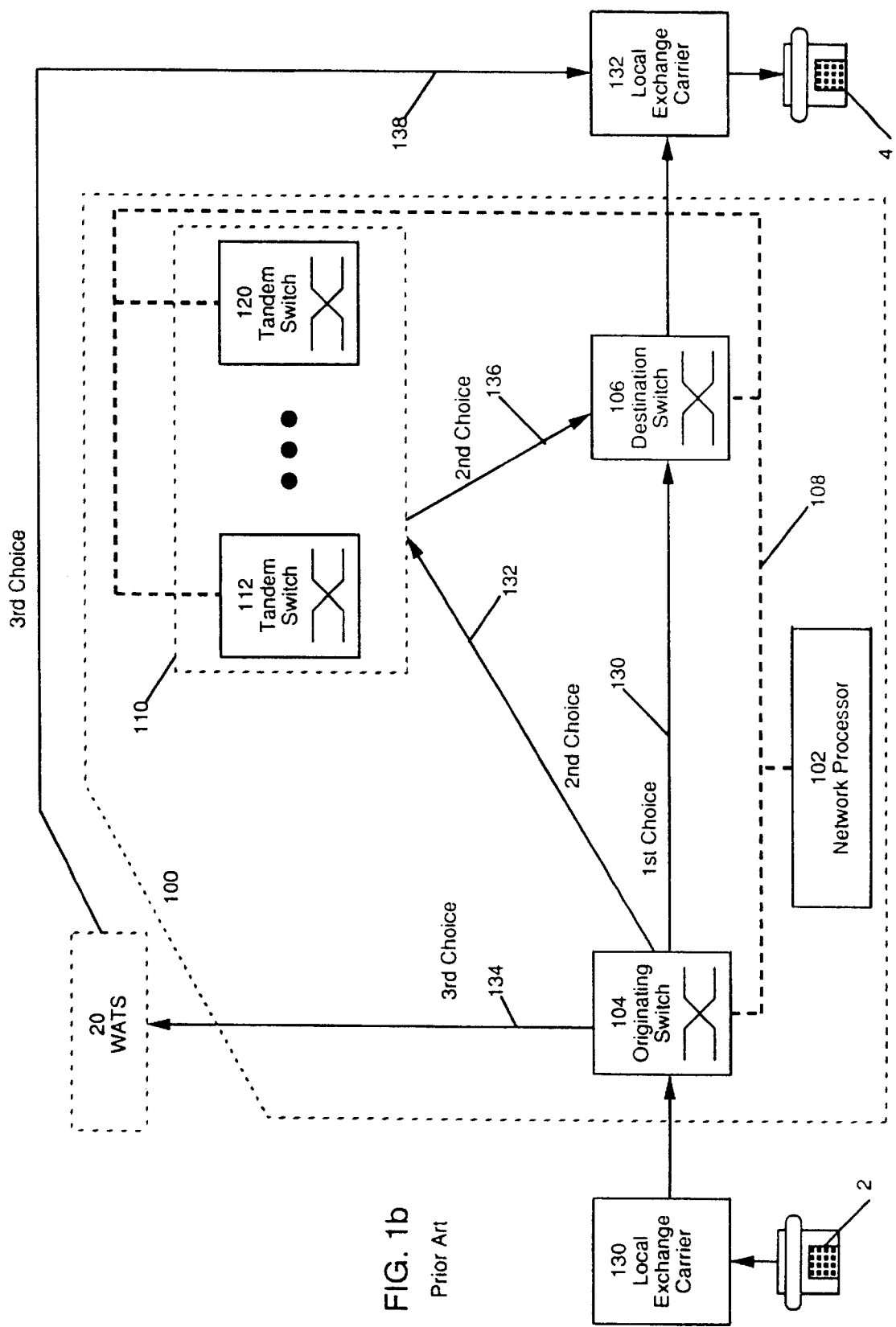
FIG. 1b is a block diagram of one level 100 of a prior art long distance network showing an example of multiple routing attempts.
Figure 2A:
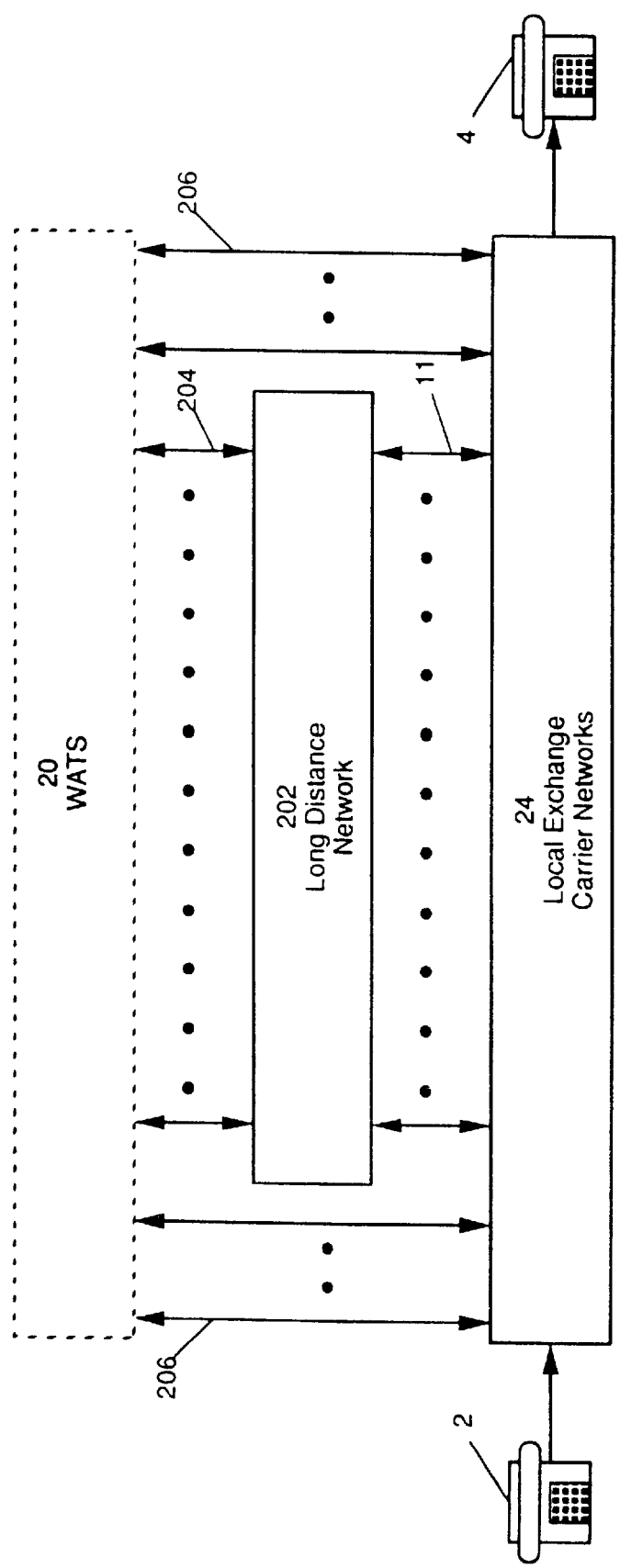
FIG. 2a is an exemplary block diagram of a telecommunications network 200, in accordance with the present invention.

FIG. 2a is an exemplary block diagram of a telecommunications network 200, in accordance with the present invention. Block 202 represents a long distance network incorporating the present invention. Long distance network 202 is capable of routing calls entirely within itself. Block 24 represents multiple local exchange carrier (LEC) networks which can route calls within more limited areas. Telephone stations are connected to the LEC networks 24. Block 20 represents WATS lines maintained with long distance carriers other than long distance network 202. LEC networks 24 have multiple connections 11 to long distance network 202 as well as multiple connections 206 to WATS 20. Long distance network 202 also has multiple connections 204 with WATS 20.

Figure 2B:
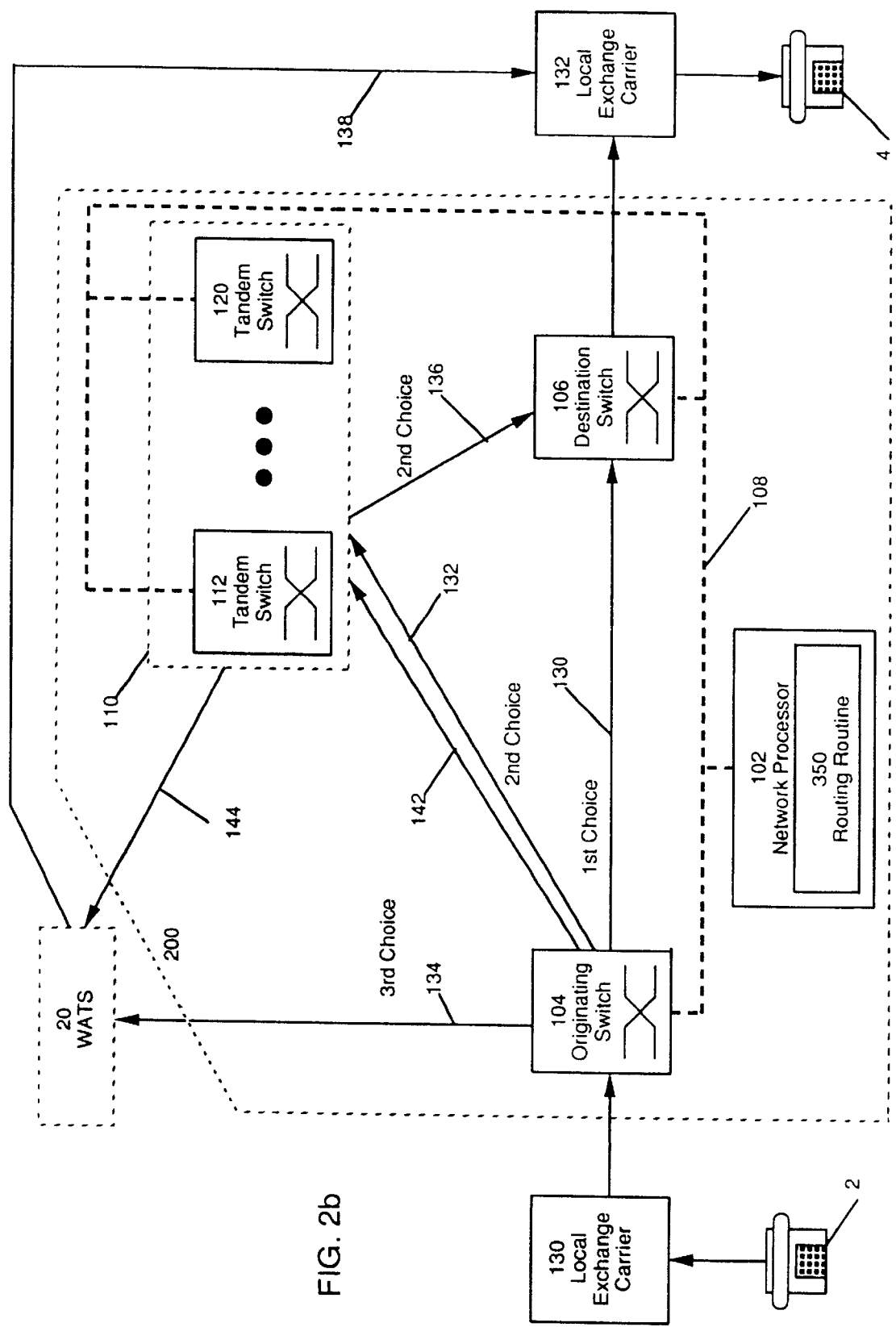

FIG. 2b is an example of multiple call routing in accordance with the present invention. In FIG. 2b, a call is placed from telephone station 2, the originating station, to telephone station 4, the terminating station. Telephone station 2 is coupled through LEC 130 to originating switch 104, the switch through which the call enters network 200. Telephone station 4 is coupled through LEC 132 to destination switch 106, the switch through which the call exits network 200. The call is to be routed from originating switch 104 to LEC 132. Originating switch 104 first attempts a direct route 130 (first choice) to destination switch 106.

If direct routing is unavailable, network processor (NP) 102 recommends routing through a tandem switch 112 to 120 over routes 132 and 136 (second choice). Block 110 represents multiple tandem switches 112 to 120 present in network 200. Originating switch 104 and destination switch 106 each connect to a plurality of tandem switches. NP 102 monitors the traffic on each switch and recommends a particular tandem switch. NP 102 generates the recommendation with routing routine 350. Routing routine 350 comprises program instructions which implement the portions of process 300 of FIG. 3 which are performed by NP 102. Routing routine 350 is a series of program instructions stored, as is shown in FIG. 4, in the memory of NP 102 and is executed by the CPU of NP 102.

If tandem routing is unavailable, originating switch 104 then attempts direct routing to wide area telephone service (WATS) lines 20 over route 134 (third choice). If routing to WATS is successful, WATS 20 completes the call to local exchange carrier (LEC) 132 over route 138. If direct WATS routing is unavailable, NP 102 finally recommends routing to WATS 20 through tandem switch 112 to 120 over routes 142 and 144 (fourth choice). If routing to WATS is successful, WATS 20 completes the call to local exchange carrier (LEC) 132 over route 138. If tandem WATS routing is unavailable, NP 102 cannot make any further recommendations and the call is blocked.

Figure 3:
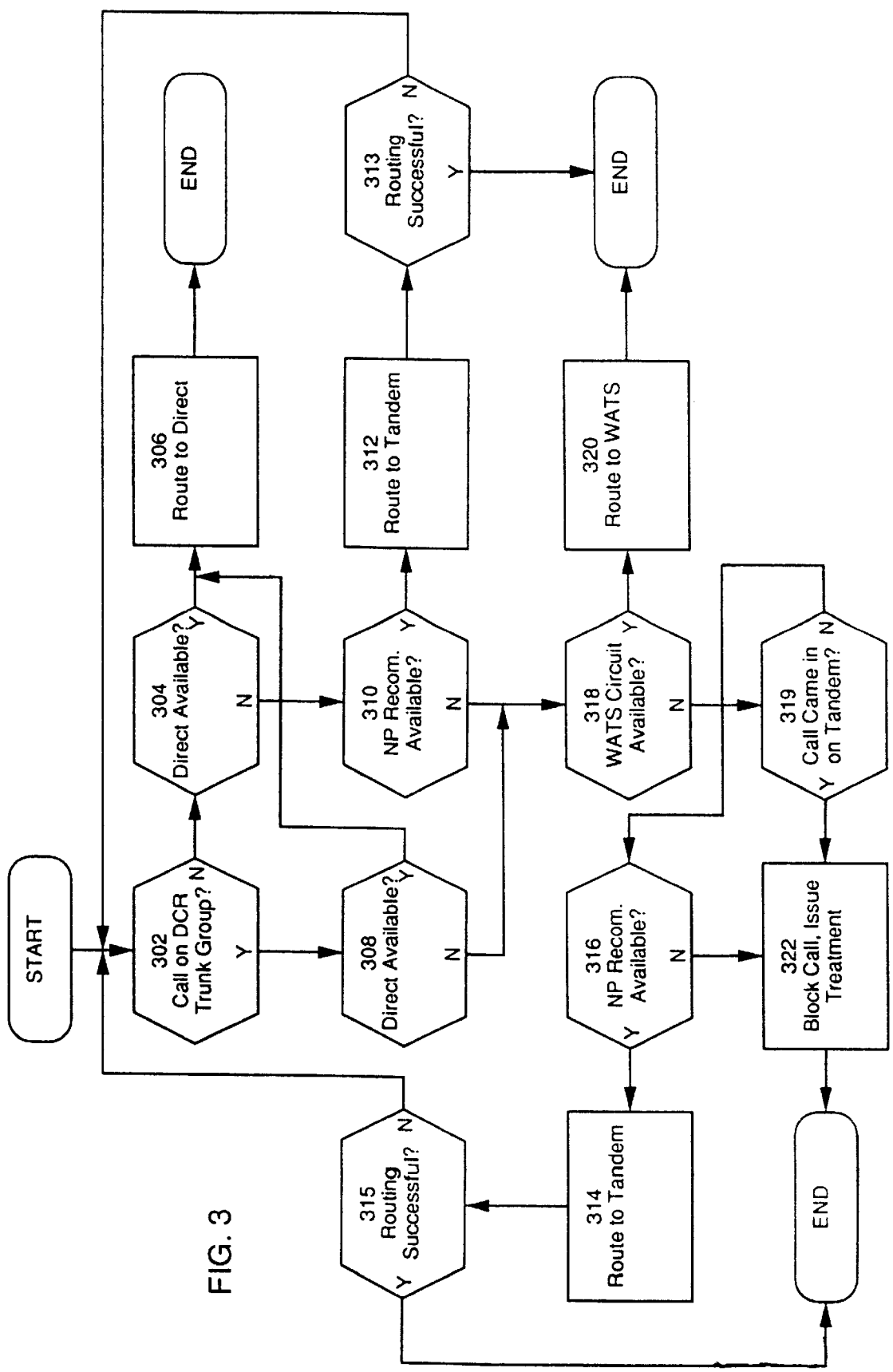
Figure 4:
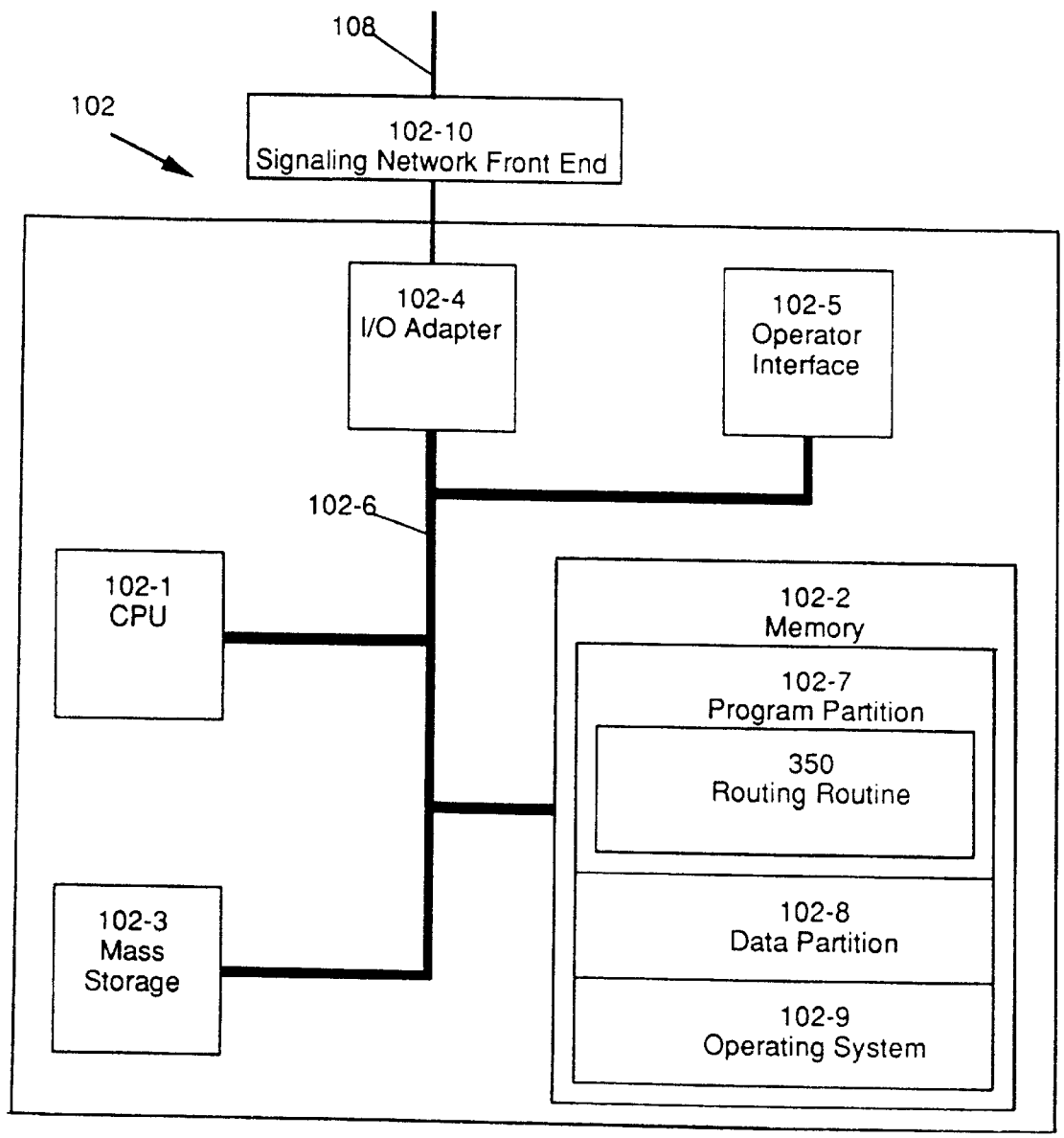

FIG. 3 is a flow diagram of the process implemented in network 200. The process begins with step 302, in which it is determined whether the call is on a DCR trunk group. This is done to prevent the call from looping around the network. If the call is not on a DCR trunk group, the process goes to step 304. If the call is on a DCR trunk group, the process goes to step 308.

In step 304, the originating switch determines, for a call which is not on a DCR trunk group, whether a direct routing (first choice) is available. If a direct routing is available, the process goes to step 306, in which the direct routing is completed. The process then ends. If a direct routing is not available, the process goes to step 310.

In step 308, originating switch 104 determines, for a call which is on a DCR trunk group, whether a direct routing (first choice) is available. If a direct routing is available, the process goes to step 306, in which the direct routing is completed. The process then ends. If a direct routing is not available, the process goes to step 318.

In step 310, the network processor determines whether a tandem routing recommendation (second choice) is available. If a tandem routing recommendation is available, the process goes to step 312, in which the routing to the tandem is completed. The tandem then attempts to complete the call to the destination switch. In step 313, the tandem determines whether the routing was successful. If the routing was successful, the process ends. If the routing was not successful, the process loops to step 302. In step 310, if a tandem routing recommendation is not available, the process goes to step 318.

In step 318, the originating switch determines whether a direct routing to a WATS circuit (third choice) is available. If a direct routing to a WATS circuit is available, the process goes to step 320, in which the direct routing to a WATS circuit is completed. The process then ends. If a direct routing to a WATS circuit is not available, the process goes to step 319.

In step 319, the originating switch determines whether the call came in on a tandem trunk. If so, the process goes to step 322, in which the call is blocked and a treatment issued. If not, the process goes to step 316.

In step 316, the network processor determines whether a tandem routing recommendation to a WATS circuit (fourth choice) is available. If a tandem routing recommendation to a WATS circuit is available, the process goes to step 314, in which the routing to the tandem is completed. The tandem then attempts to complete the call to the WATS circuit. In step 315, the tandem determines whether the routing was successful. If the routing was successful, the process ends. If the routing was not successful, the process loops to step 302. In step 316, if a tandem routing recommendation to a WATS circuit is not available, the process goes to step 322, in which the call is blocked and a treatment issued. The process then ends.

FIG. 4 is an exemplary block diagram of a network processor 102. Although only one network processor is shown in FIG. 2, it is well known in the art that a distributed architecture in which more than one computer system performs each function is entirely equivalent. Network processor 102 includes several elements. CPU 102-1 executes program instructions and processes data. Memory 102-2 stores program instructions executed by and data processed by CPU 102-1. Mass storage 102-3 stores data to be transferred to and from memory. Mass storage includes such devices as, for example, hard disk drives, floppy disk drives, removable disk drives, magneto-optic drives, optical drives and tape drives. I/O adapter 102-4 communicates with other devices and transfers data in and out of network processor 102 over signaling network 108 by way of signaling network front end 102-10. I/O adapter 102-4 represents one or more I/O adapters or network interfaces which may connect to local or wide area networks, such as, for example, Ethernet or Token Ring or through a front end, such as signaling network front end 102-10, to a signaling network, such as, for example, ANSI SS7. Network processor 102 may also include operator interface 102-5, which provides status information to and accepts commands from a system operator. All these elements are interconnected by bus 102-6, which allows data to be intercommunicated between the elements.

Memory 102-2 is accessible by CPU 102-1 over bus 102-6 and includes operating system 102-9, program partition 102-7 and data partition 102-8. Program partition 102-7 stores and allows execution by CPU 102-1 of program instructions, including routing routine 350 which implements process 300. Data partition 102-8 is accessible by CPU 102-1 and stores data used during the execution of program instructions.

Although a specific embodiment has been disclosed, it will be seen by those of skill in the art that there are other embodiments possible which are equivalent to that disclosed.

What is claimed is:

1. A system for completing a call from a calling telephone station to a called telephone station through a wide area telephone service, the called telephone station being served by a local exchange carrier, the system comprising:

an originating switch coupled to the calling telephone station;

a plurality of tandem switches, at least one of which being coupled to the originating switch and to the wide area telephone service; and a network processor, communicatively coupled to the originating switch, selecting a tandem switch and recommending a routing path from the originating switch to the local exchange carrier network through the selected tandem switch and the wide area telephone service.

2. The system of claim 1, wherein said network processor further comprises a memory for storing a routine having instructions for recommending said routing path.

3. The system of claim 1, wherein said origination switch is further connected to said wide area telephone service, and wherein said network processor can alternatively recommend a path connecting said origination switch to said local exchange carrier network directly via said wide area telephone service.

4. A method of utilizing a first telephone network having a plurality of switches and at least one wide area telephone service of a second telephone network for routing a call from a calling telephone station to a called telephone station, comprising the steps of:

(a) determining if a first route directly connecting an origination switch through which said call from said calling telephone station enters said first telephone network and a destination switch to which said call is routed to said called telephone station has sufficient call traffic capacity to carry said call;

(b) routing said call from said origination switch to said destination switch if said first route does have sufficient call traffic capacity;

(c) obtaining a second route connecting said origination switch to an intermediate switch if said call cannot be sent via said first route, said intermediate switch further being connected to said destination switch;

(d) routing said call from said origination switch to said destination switch using said second route;

(e) determining a third route that directly connects said origination switch to said one wide area telephone service if said call cannot be sent via said second route;

(f) directing said call onto said third route to send said call from said origination switch to said called telephone station; and (g) directing said call to a fourth route that connects said intermediate switch to said wide area telephone service if said call cannot get through to said called telephone station via said third route.

5. The method of claim 4 wherein the routing of said call directly from said originating switch to said destination switch in said step (b) is performed by said origination switch.

6. The method of claim 4, wherein said step (c) further comprises:

obtaining a recommendation of said second route from a network processor; and wherein the routing of said call from said origination switch to said destination switch through an intermediate switch in said step (d) is performed by said origination switch based on a recommendation from said network processor.

7. The method of claim 4, wherein the routing of said call from said origination switch to said one wide area telephone service in said step (e) is performed by said origination switch.

8. The method of claim 4, wherein the routing of said call to said one wide area telephone service through said intermediate switch in said step (g) is performed by said origination switch based on a recommendation from a network processor.

9. The method of claim 4, wherein said step (e) further comprises the steps of:

utilizing a network processor to generate a recommended route from said origination switch to said one wide area telephone service;

transmitting said recommended route from said network processor to said origination switch; and said origination switch directing said call to travel from said origination switch to said one wide area telephone service in accordance with said recommended route.

10. The method of claim 4, wherein said steps (b), (d) and (f) each are performed by said origination switch; and wherein said step (g) is performed by said origination switch using a route recommended by a network processor.

11. The method of claim 4, wherein said steps (b), (d) and (f) each are performed by said origination switch; and wherein said step (g) further comprises the steps of:

utilizing a network processor to generate a recommended route from said origination switch to said one wide area telephone service;

transmitting said recommended route from said network processor to said origination switch; and said origination switch routing said call in accordance with said recommended route.

* * * * *